US 9,602,527 B2

(12) United States Patent
Yu

(10) Patent No.: US 9,602,527 B2
(45) Date of Patent: Mar. 21, 2017

(54) SECURITY THREAT DETECTION

(71) Applicant: Fortinet, Inc., Sunnyvale, CA (US)

(72) Inventor: Qianyong Yu, Burnaby (CA)

(73) Assignee: Fortinet, Inc., Sunnyvale, CA (US)

( * ) Notice: Subject to any disclaimer, the term of this patent is extended or adjusted under 35 U.S.C. 154(b) by 0 days.

(21) Appl. No.: 14/662,456

(22) Filed: Mar. 19, 2015

(65) Prior Publication Data

US 2016/0277431 A1    Sep. 22, 2016

(51) Int. Cl.
*G06F 21/62* (2013.01)
*H04L 29/06* (2006.01)

(52) U.S. Cl.
CPC ............... *H04L 63/1425* (2013.01)

(58) Field of Classification Search
CPC .............. H04L 63/1425; H04L 63/0227
USPC .......................................... 726/22
See application file for complete search history.

(56) References Cited

U.S. PATENT DOCUMENTS

| | | | | |
|---|---|---|---|---|
| 9,043,894 B1* | 5/2015 | Dennison | ........... | G06F 21/566 726/11 |
| 2003/0131256 A1* | 7/2003 | Ackroyd | ........... | G06F 21/552 726/23 |
| 2006/0026680 A1* | 2/2006 | Zakas | ........... | H04L 29/06 726/22 |
| 2007/0083928 A1* | 4/2007 | Mattsson | ........... | G06F 21/552 726/22 |
| 2016/0112440 A1* | 4/2016 | Kolton | ........... | G06F 21/567 726/1 |

\* cited by examiner

*Primary Examiner* — Amir Mehrmanesh
*Assistant Examiner* — Sakinah Taylor
(74) *Attorney, Agent, or Firm* — Hamilton, DeSanctis & Cha LLP

(57) ABSTRACT

Systems and methods for retrospective scanning of network traffic logs for missed threats using updated scan engines are provided. According to an embodiment, a network security device maintains a network traffic log that includes information associated with network activities observed within a private network. Responsive to an event, the network traffic log is retrospectively scanned in an attempt to identify a threat that was missed by a previous signature-based scan or a previous reputation-based scan of the observed network activities. When the threat is identified as a result of the retrospective scan, then remedial and/or preventive action is taken with respect to the threat.

20 Claims, 4 Drawing Sheets

SECURITY THREAT DETECTION

COPYRIGHT NOTICE

Contained herein is material that is subject to copyright protection. The copyright owner has no objection to the facsimile reproduction of the patent disclosure by any person as it appears in the Patent and Trademark Office patent files or records, but otherwise reserves all rights to the copyright whatsoever. Copyright© 2015, Fortinet, Inc.

BACKGROUND

Field

Embodiments of the present invention generally relate to the field of network security techniques. In particular, various embodiments relate to scanning network traffic logs retrospectively to detect threats missed during one or more prior signature-based scans.

Description of the Related Art

Network security appliances (e.g., firewalls, intrusion prevention systems (IPS), anti-virus (AV) devices and unified threat management (UTM) appliances) are deployed at the borders of networks to scan network traffic going through networks that are managed by the network security devices. Once a threat in the network traffic is detected by the network security devices, the network security devices may take an action to protect the networks (e.g., blocking the network traffic, recording the activity of the network traffic in a log, quarantining an associated resource, sending a message to the network administrator). The network security devices may also maintain network traffic logs to record part or all network activities observed within the networks.

The primary method of detecting network security threats is signature-based scanning. A detection engine of a network security device may scan network traffic in real time based on a signature database that can be accessed by the network security device locally or remotely. The network security device may also send the local network traffic log to a central or cloud-based log management system for additional scanning based on a more powerful signature database managed by the central or cloud-based log management system. For signature-based network security devices, a good signature database is critical for detecting threats timely and effectively. However, the signature creation process suffers from several delays, including a threat discovery delay that represents the time period between when a threat is encountered in the wild and when it is submitted to a security vendor, a threat identification delay that represents the time required to confirm that a potential threat is indeed an actual threat, a signature creation delay that represents the time required to create a signature that can properly identify the threat, a signature testing delay that represents the time required to verify that the signature does not trigger a false positive and a signature distribution delay that represents the time for the update package containing the new signature to be received by subscribing network security devices. Due to these delays, security threats are often missed by signature-based security solutions within the first hours, days or even weeks after the threats have first been encountered. To solve this problem, a host-based security solution (e.g., antivirus (AV) software) may periodically scan the entire computer with the latest signatures to catch threats missed by a network-based security solution. Unfortunately, network-based security appliances do not have this kind of luxury, since, among other things, it is impractical to store all the files or contents that have previously been scanned in order to scan them again later.

SUMMARY

Systems and methods are described for retrospective scanning of network traffic logs for missed threats using updated scan engines. According to an embodiment, a network security device maintains a network traffic log that includes information associated with network activities observed within a private network. Responsive to an event, the network traffic log is retrospectively scanned in an attempt to identify a threat that was missed by a previous signature-based scan or a previous reputation-based scan of the observed network activities. When the threat is identified as a result of the retrospective scan, then remedial and/or preventive action is taken with respect to the threat.

Other features of embodiments of the present invention will be apparent from the accompanying drawings and from the detailed description that follows.

BRIEF DESCRIPTION OF THE DRAWINGS

Embodiments of the present invention are illustrated by way of example, and not by way of limitation, in the figures of the accompanying drawings and in which like reference numerals refer to similar elements and in which.

DETAILED DESCRIPTION

Figure 1:
FIG. 1 illustrates an exemplary network architecture in accordance with an embodiment of the present invention.

Systems and methods are described for retrospective scanning of network traffic logs for missed threats using updated scan engines. According to an embodiment, a network security device maintains a network traffic log that records previous network activities of multiple network appliances. The network security device scans the network traffic log retrospectively for a threat that is missed in previous scanning in response to an event and performs an action against the threat if the threat is found in the retrospective scan.

In the following description, numerous specific details are set forth in order to provide a thorough understanding of embodiments of the present invention. It will be apparent, however, to one skilled in the art that embodiments of the present invention may be practiced without some of these specific details. In other instances, well-known structures and devices are shown in block diagram form.

Embodiments of the present invention include various steps, which will be described below. The steps may be performed by hardware components or may be embodied in machine-executable instructions, which may be used to cause a general-purpose or special-purpose processor programmed with the instructions to perform the steps. Alternatively, the steps may be performed by a combination of hardware, software, firmware and/or by human operators.

Embodiments of the present invention may be provided as a computer program product, which may include a machine-readable storage medium tangibly embodying thereon instructions, which may be used to program a computer (or other electronic devices) to perform a process. The machine-readable medium may include, but is not limited to, fixed (hard) drives, magnetic tape, floppy diskettes, optical disks, compact disc read-only memories (CD-ROMs), and magneto-optical disks, semiconductor memories, such as ROMs, PROMs, random access memories (RAMs), programmable read-only memories (PROMs), erasable PROMs (EPROMs), electrically erasable PROMs (EEPROMs), flash memory, magnetic or optical cards, or other type of media/machine-readable medium suitable for storing electronic instructions (e.g., computer programming code, such as software or firmware). Moreover, embodiments of the present invention may also be downloaded as one or more computer program products, wherein the program may be transferred from a remote computer to a requesting computer by way of data signals embodied in a carrier wave or other propagation medium via a communication link (e.g., a modem or network connection).

In various embodiments, the article(s) of manufacture (e.g., the computer program products) containing the computer programming code may be used by executing the code directly from the machine-readable storage medium or by copying the code from the machine-readable storage medium into another machine-readable storage medium (e.g., a hard disk, RAM, etc.) or by transmitting the code on a network for remote execution. Various methods described herein may be practiced by combining one or more machine-readable storage media containing the code according to the present invention with appropriate standard computer hardware to execute the code contained therein. An apparatus for practicing various embodiments of the present invention may involve one or more computers (or one or more processors within a single computer) and storage systems containing or having network access to computer program(s) coded in accordance with various methods described herein, and the method steps of the invention could be accomplished by modules, routines, subroutines, or subparts of a computer program product.

Notably, while embodiments of the present invention may be described using modular programming terminology, the code implementing various embodiments of the present invention is not so limited. For example, the code may reflect other programming paradigms and/or styles, including, but not limited to object-oriented programming (OOP), agent oriented programming, aspect-oriented programming, attribute-oriented programming (@OP), automatic programming, dataflow programming, declarative programming, functional programming, event-driven programming, feature oriented programming, imperative programming, semantic-oriented programming, functional programming, genetic programming, logic programming, pattern matching programming and the like.

Terminology

Brief definitions of terms used throughout this application are given below.

If the specification states a component or feature "may", "can", "could", or "might" be included or have a characteristic, that particular component or feature is not required to be included or have the characteristic.

The phrase "network security device" generally refers to a hardware device or appliance configured to be coupled to a network and to provide one or more of data privacy, protection, encryption and security. The network security device can be a device providing one or more of the following features: network firewalling, VPN, antivirus, intrusion prevention (IPS), content filtering, data leak prevention, antispam, antispyware, logging, reputation-based protections, event correlation, network access control, vulnerability management. Load balancing and traffic shaping—that can be deployed individually as a point solution or in various combinations as a unified threat management (UTM) solution. Non-limiting examples of network security devices include proxy servers, firewalls, VPN appliances, gateways, UTM appliances and the like.

The phrase "network appliance" generally refers to a specialized or dedicated device for use on a network in virtual or physical form. Some network appliances are implemented as general-purpose computers with appropriate software configured for the particular functions to be provided by the network appliance; others include custom hardware (e.g., one or more custom Application Specific Integrated Circuits (ASICs)). Examples of functionality that may be provided by a network appliance include, but is not limited to, Layer 2/3 routing, content inspection, content filtering, firewall, traffic shaping, application control, Voice over Internet Protocol (VoIP) support, Virtual Private Networking (VPN), Internet Protocol (IP) security (IPSec), Secure Sockets Layer (SSL), antivirus, intrusion detection, intrusion prevention, Web content filtering, spyware prevention and anti-spam. Examples of network appliances include, but are not limited to, network gateways and network security devices (e.g., FORTIGATE family of network security devices and FORTICARRIER family of consolidated security appliances), messaging security appliances (e.g., FORTIMAIL family of messaging security appliances), database security and/or compliance appliances (e.g., FORTIDB database security and compliance appliance), web application firewall appliances (e.g., FORTIWEB family of web application firewall appliances), application acceleration appliances, server load balancing appliances (e.g., FORTIBALANCER family of application delivery controllers), vulnerability management appliances (e.g., FORTISCAN family of vulnerability management appliances), configuration, provisioning, update and/or management appliances (e.g., FORTIMANAGER family of management appliances), logging, analyzing and/or reporting appliances (e.g., FORTIANALYZER family of network security reporting appliances), bypass appliances (e.g., FORTIBRIDGE family of bypass appliances), Domain Name Server (DNS) appliances (e.g., FORTIDNS family of DNS appliances), wireless security appliances (e.g., FORTIWIFI family of wireless security gateways), FORIDDOS, wireless access point appliances (e.g., FORTIAP wireless access points), switches (e.g., FORTISWITCH family of switches) and IP-PBX phone system appliances (e.g., FORTIVOICE family of IP-PBX phone systems).

The terms "connected" or "coupled" and related terms are used in an operational sense and are not necessarily limited to a direct connection or coupling. Thus, for example, two devices may be coupled directly, or via one or more intermediary media or devices. As another example, devices may be coupled in such a way that information can be passed there between, while not sharing any physical connection with one another. Based on the disclosure provided herein, one of ordinary skill in the art will appreciate a variety of ways in which connection or coupling exists in accordance with the aforementioned definition.

If the specification states a component or feature "may", "can", "could", or "might" be included or have a characteristic, that particular component or feature is not required to be included or have the characteristic.

FIG. 1 illustrates an exemplary network architecture 100 in accordance with an embodiment of the present invention. Network architecture 100 shown in FIG. 1 comprises a private network 110, multiple branch office networks 121 and 122 and a central log management device 140. In the context of the present example, private network 110 and branch office networks 121 and 122, PC 123 and mobile phone 124 are connected through internetworks (e.g., the Internet 130). Private network 110 includes multiple network appliances, such as local server 111a, PC 111b, laptop 111c, mobile phone 111d and other computing devices that are operatively coupled to each other through a Local Area Network (LAN), wherein the LAN is then operatively coupled with gateway 112 which enables access to Internet 130. Gateway 112 separates the external computing environment, represented by Internet 130, from the internal computing environment of private network 110. Gateway 112 may intercept communications between Internet 130 and the network appliances of private network 110 and scan for malware, viruses or other high risk network accesses. The internal structures of branch office networks 121 and 122 are omitted as they may be similar to that of private network 110.

In one embodiment, gateway 112 is a rule-based network security device that controls traffic going through its interfaces. Usually, gateway 112 includes multiple physical network interfaces, including, but not limited to an internal interface with 4-24 or more Ethernet ports, 1-4 or more wide area network (WAN) interfaces and one demilitarized zone (DMZ) interface. Further, when private network 110 is separated into multiple virtual LANs (VLANs), gateway 112 may also define multiple virtual interfaces for each of the VLANs.

Gateway 112 includes a rule set with multiple rules created by the network administrator that controls the traffic going through gateway 112. In the context of each rule, traffic is typically identified by source interfaces, destination interfaces, source Internet Protocol (IP) addresses, destination IP addresses, users/user groups, devices and/or other parameters of the traffic. After the traffic flow is defined, an action controlling the traffic flow, e.g., accept or deny, is designated in each rule. In operation, all traffic going through interfaces of gateway 112 is captured by gateway 112. The source interface, destination interface and other parameters of the captured traffic flow are matched with the rules of a rule set. The first matched rule in the rule set is typically used for controlling the traffic flow and the traffic flow is processed based on the action defined in the matched rule. Further, traffic shaping, antivirus protection, antispyware protection, intrusion prevention, and other unified threat management (UTM) features can be applied to the network traffic by a scan engine (not shown) of gateway 112. The scan engine may include a signature-based engine and a signature database that includes a list of signatures that are used for identifying threats. The signature database may be downloaded from a security vendor and stored locally by gateway 112. Gateway 112 may also record context of the network traffic or part of the network traffic in a network traffic log. The network traffic log may be sent to a log management system, (e.g., central log management device 140) or a cloud-based log management system. In an exemplary embodiment of the present invention, gateway 112 may be a FORTIGATE gateway available from Fortinet, Inc. of Sunnyvale, Calif. (FORTIGATE is a trademark or registered trademark of Fortinet, Inc.).

Central log management device 140 may collect network traffic logs from multiple network security devices that manage a private network, such as private network 110. In an exemplary embodiment of the present invention, central log management device 140 may be a FORTIANALYZER available from Fortinet, Inc. of Sunnyvale, Calif. (FORTIANALYZER is a trademark or registered trademark of Fortinet, Inc.). Central log management device 140 may also be a cloud-based log management system that provides logging services and collecting network traffic log from multiple private networks. The cloud-based log management system may be FORTICLOUD available from Fortinet, Inc. of Sunnyvale, Calif.

In the present example, gateway 112 and central log management device 140 further comprises a scan engine that scans the network traffic log retrospectively for threats that may have been missed by previous scanning. The retrospective scanning may be triggered by or responsive to an update of the scan engine (e.g., the existence of new signatures) or other events. Retrospective scanning is described further with reference to FIGS. 2 and 3.

Figure 2:
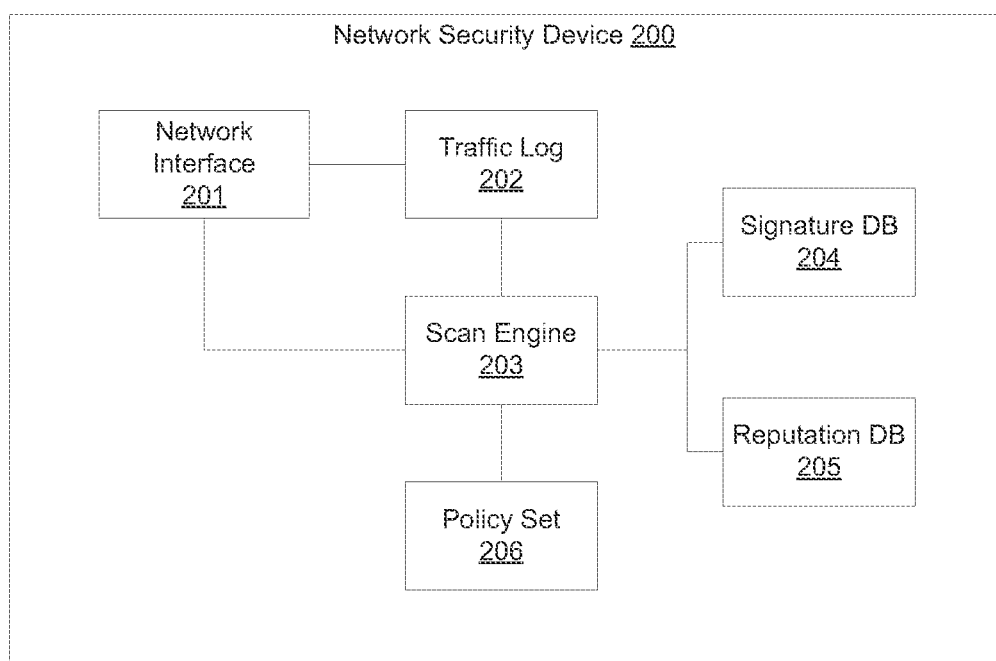
FIG. 2 illustrates exemplary functional units of a network security device in accordance with an embodiment of the present invention.

FIG. 2 illustrates exemplary functional units of a network security device 200 in accordance with an embodiment of the present invention. In the context of the current example, network security device 200, which may represent a gateway (e.g., gateway 112) or a central log management device (e.g., central log management device 140), comprises a network interface 201, a traffic log 202, a scan engine 203, a signature database 204, a reputation database 205 and a policy set 206.

Network interface 201 may be any of a Local Area Network (LAN), Wide Area Network (WAN) or other type of network interface controller. In some embodiments, network interface 201 is used for capturing information regarding network traffic going through networks that are managed by network security device 200. Network traffic, characteristics thereof and/or metadata related thereto that is captured by network security device 200 may be recorded in traffic log 202. When network traffic is going through network security device 200 and is captured by network interface 201, the network traffic may be scanned in real time by scan engine 203. Any security threats, e.g., computer viruses, malware and data leakages, that can be detected based on the present signatures within signature database 204 are blocked by network security device 200. However, some threats may not be detected by the present scan engine 203 due to the limitations of the present algorithms of scan engine 203, signature database 204 and/or reputation database 205. In some embodiments, scan engine 203 may identify potential security threats while scanning the network traffic in real time and record information regarding the potential security threats in traffic log 202. The potential threats may include, but are not limited to, files that are determined to be suspicious by scan engine 203, but that do not match any existing virus signature, Uniform Resource Locators (URLs) that do not have existing Web Filter ratings or have poor reputation scores and IP addresses that are geo-located to a region/country not typically visited by the intended recipient. In some embodiments, information regarding all files, URLs and IP addresses associated with content or requests passing through network security device 200 can be considered potential threats for enhanced security and may be recorded in traffic log 202.

Traffic log 202 is used for recording information regarding potential threats and/or previous activities that occurred on the network managed by network security device 200. Each log entry may contain a feature or features associated with a potential threat (e.g., network activities) that can be used in connection with performing retrospective scans to detect security threats. In one embodiment, traffic log 202 may store the features of the potential threats in a form that does not require too much storage and can be efficiently matched against a list of signatures to detect threats in the network traffic. For example, these features may include, but are not limited to, (i) a cryptographic hash (e.g., Secure Hash Algorithm 256 (SHA 256)) or fuzzy hash (e.g., SSDeep) of a file at issue, (ii) one or more IP address observed in the traffic at issue and/or (iii) a cryptographic hash of or the entire URL of a web resource at issue. In another embodiment, the log entry may also include contextual information that may be helpful in connection with performing remedial/preventative actions. Non-limiting examples of contextual information include time stamps of network traffic, source and/or destination IP addresses, users mapped to the destination IP address at the time the network traffic was captured, URLs from which files were downloaded. In a further embodiment, part or entire data packets of network traffic going through the networks managed by security device 200 may be stored in traffic log 202 to be retrospectively scanned.

Signature database 204 can be a collection of signatures that can be used for detecting security threats based on characteristics of security threats. A security vendor can monitor network activities all over multiple networks as well as the Internet. When a threat is detected, the characteristics of the threat are analyzed and an algorithm for detecting the threat may be generated by the security vendor in the form of a signature of the threat. The newly generated signature may be added to signature database 204 by the security vendor. For example, signature database 204 may be automatically periodically pushed to or downloaded by network security device 200. Alternatively or additionally, updates may be performed on demand by a network administrator.

Reputation database 205 can be a collection of reputation scores for network resources, e.g., websites, URLs, files, applications or network users. A security vendor can monitor network resources all over multiple networks as well as the Internet. The security vendor may test a network resource to detect any threat or any undesired activities, e.g., the existence of a virus, malware or advertisements, existing in the network resource. Based on the test result and other characteristics of the network resource, e.g., the source IP address or region or the creator of the network resource, a reputation score may be assigned to the network resource. The reputation score of a network resource may also be assigned based on an aggregate score voted on and/or contributed by users all over the Internet. The security vendor may add reputation scores for newly detected network resources or update reputation scores for existing resources based on recent detection or vote of the resources. For example, the updates to reputation database 205 may be automatically periodically downloaded or accessed by network security device 200. Alternatively or additionally, updates may be performed on demand by a network Scan engine 203 may be used for detecting threats present in the network traffic captured by network security device 200 in real time. In one embodiment, scan engine 203 is also used for scanning the network traffic log retrospectively based on an update of scan engine 203. For example, signature database 204 or reputation database 205 of a central log management device 140 may be updated from time to time. The updates of these databases can be accessed by or downloaded to network security device 200. After signature database 204 or reputation database 205 is updated, scan engine 203 conducts a retrospective scan of those potential threats or previous network activities that have been recorded in traffic log 202 so that threats that may have been missed in by previous scans that were performed based on a previous versions of signature database 204 and/or reputation database 205 may now potentially be identified based on an updated version of scan engine 203. Depending upon the particular embodiment, the retrospective scan may be triggered by an event (e.g., an update to signature database 204 and/or reputation database 205). In some embodiments, the retrospective scan may be invoked automatically in accordance with a defined or configurable period (e.g., hourly or daily) or by scheduled tasks. The retrospective scan may also be manually invoked by a network administrator.

When a previously missed threat is identified by the retrospective scan, network security device 200 may take an action against the threat. For example, a remedial action may be performed by network security device 200 to prevent potential damage being caused by the missed threat. The remedial action may include, but is not limited to, notifying a user mapped to the threat, notifying an administrator of network security device 200, increasing security scrutiny for a destination of the threat, decreasing a security reputation score of a destination of the threat, and blocking a destination of the threat. A preventative action to defend against the missed threat may also be performed by security device 200. Non-limiting examples of preventative actions include increasing security scrutiny for a source of the threat; decreasing a security reputation score of a source of the threat; blocking a source of the threat; and/or blocking of other potential threats that share significant features with the threat.

Policy set 206 is used for defining how the retrospective scan is conducted by scan engine 203. For example, suppose that a threat is first discovered by the network security community at time A, while the signature of the threat is created later at time B. Further assume, the threat was missed by scan engine 203 during the time period between time A and time B by the real time scanning and/or retrospective scanning based on an older version of signature database 204 that did not include the newly created signature for this threat. A rule in policy set 206 may define that the retrospective scan may be conducted for network activities represented within network traffic log that occurred within a time period from time A to time B. In another embodiment, a rule of policy set 206 may define that the retrospective scan is to be conducted for network activities that were identified as potential security threats during a real time scan and/or a previous retrospective scan. The policy set 206 may also comprise rules that define what action should be performed when threats are found in the retrospective scan. It will be apparent to one skilled in the art that other rules may be defined in policy set 206 so that the retrospective scan may be conducted more efficiently.

Figure 3:
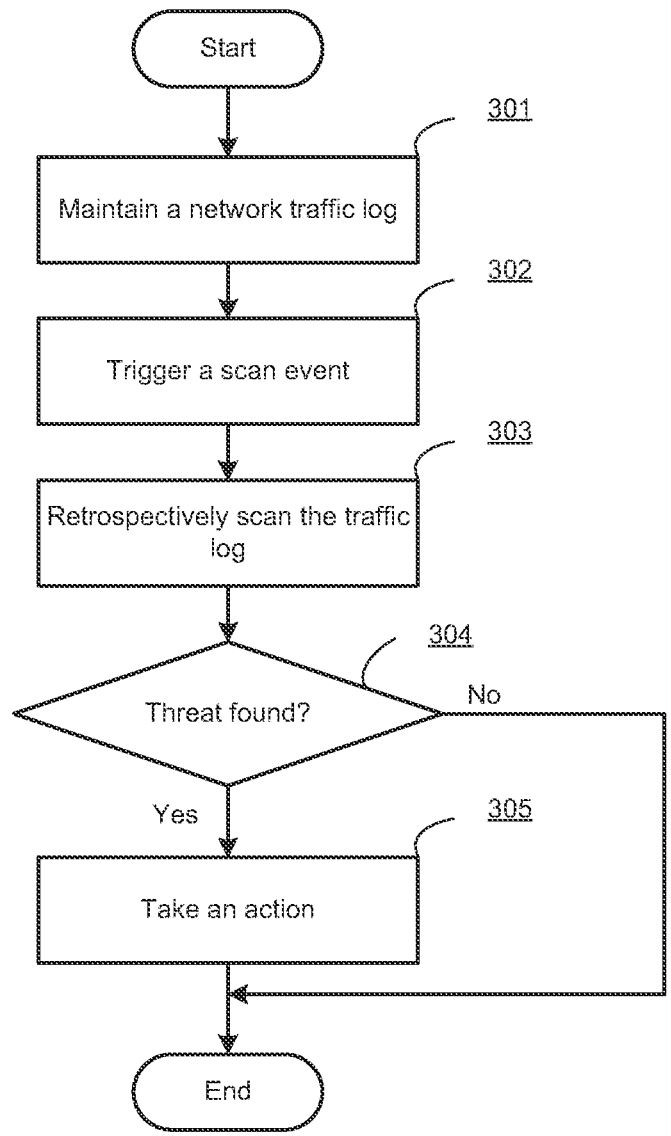
FIG. 3 is a flow diagram illustrating a method for scanning a network traffic log retrospectively for missed threats in accordance with an embodiment of the present invention.

FIG. 3 is a flow diagram illustrating a method for retrospectively scanning network traffic log for missed threats in accordance with an embodiment of the present invention.

At block 301, a network security device maintains a network traffic log that records information regarding previous network activities performed by host systems and/or other network devices within the private network protected by the network security device. In one embodiment, the network traffic log is generated locally by the network security device based on observed network traffic (e.g., the network traffic going through it or received on an interface of the network security device). In another embodiment, the network traffic log is collected by a central log management device from multiple network security devices. The network traffic log may comprise one or more entries that contain one or more features of the network traffic or network resources that can be scanned by the network security device to determine threats based on a signature database and/or a reputation database. For example, the network traffic log may record a cryptographic hash value of a file, a fuzzy hash value of a file, an IP address of the traffic, a Uniform Resource Identifier (URI) of a web resource, one or more data packets of the network traffic, and/or a cryptographic hash of an URI. The network traffic log may also include contextual information of the network traffic that can be scanned by the network security device to determine threats, including, but not limited to, a time stamp associated with the network traffic, source and destination IP addresses of the network traffic, and a user mapped to the destination IP address.

At block 302, an event that triggers retrospective scan has occurred. The event may include the completion of an update to the signature database or reputation database or an update to a scan engine of the network security device. The event may also be the expiration of a predetermined and/or configurable timer that may trigger scheduling of a retrospective scan task. Those skilled in the art will appreciate a variety of other retrospective scan triggers, including the retrospective scan being manually initiated by a network administrator.

At block 303, the network security device scans the network traffic log using the most updated scan engine to identify threats that may have been missed during previous scans that were conducted using a prior version of the scan engine, for example. By using the most updated signatures and reputation scores, threats that were previously missed but for which information was recorded in the network traffic log may subsequently be detected. In one embodiment, the network security device may retrospectively scan entries of the network traffic log that are within a predetermined time period. For example, only those entries of the network traffic log that were created during the time period between a time at which a threat was first detected to the time that a signature for the threat was created, may be scanned during the retrospective scan. In another embodiment, the network security device may retrospectively scan network activities in the network traffic log that are flagged as belonging to a predetermined class or type. For example, the network security device may tag/mark certain entries stored within the network traffic log as a "potential security threat" during real-time scanning or retrospective scanning Subsequently, when a potential security threats is confirmed to have been missed, it can be tagged/marked as a "confirmed missed threat" so as to avoid further scanning, for example.

At block 304, the network security device determines whether a threat has been found as a result of the retrospective scan. If a threat is found, an action against the threat may be performed by the network security device at block 305. The network security device may perform a remedial action to prevent potential damage that might otherwise be caused by the threat. Non-limiting examples of remedial actions include notifying a user mapped to the threat, notifying an administrator of the network security device, increasing security scrutiny for a destination of the threat, decreasing a security reputation score of a destination of the threat, and blocking a destination of the threat. The network security device may also perform a preventative action to defend against the missed threat, including, but not limited to, increasing security scrutiny for a source of the threat, decreasing a security reputation score of a source of the threat, blocking a source of the threat, and blocking of other potential threats that share significant features with the threat.

Figure 4:
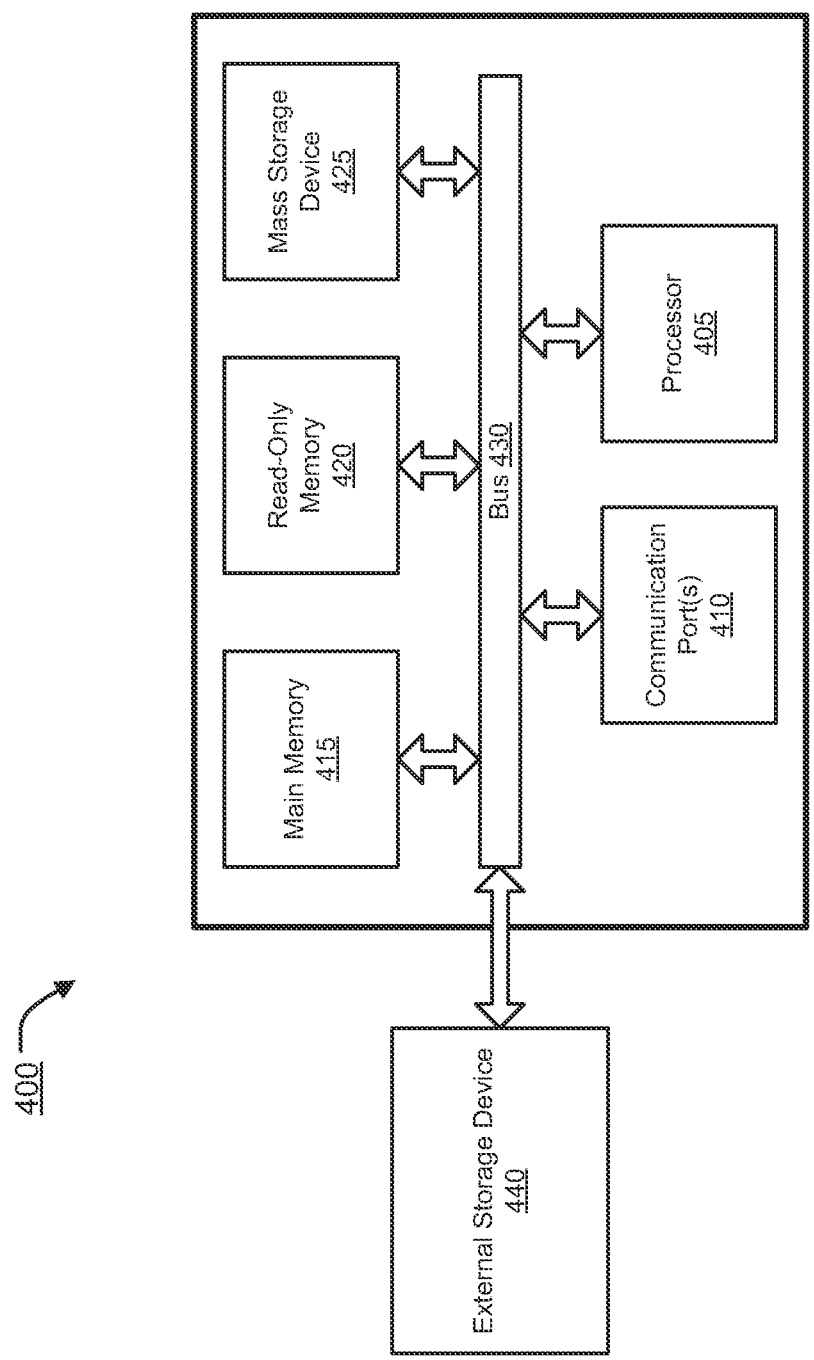
FIG. 4 is an exemplary computer system in which or with which embodiments of the present invention may be utilized.

FIG. 4 is an example of a computer system 400 with which embodiments of the present disclosure may be utilized. Computer system 400 may represent or form a part of a network security device (e.g., gateway 112 or central log management device 140), a network appliance, a server or a client workstation.

Embodiments of the present disclosure include various steps, which have been described above. A variety of these steps may be performed by hardware components or may be tangibly embodied on a computer-readable storage medium in the form of machine-executable instructions, which may be used to cause a general-purpose or special-purpose processor programmed with instructions to perform these steps. Alternatively, the steps may be performed by a combination of hardware, software, and/or firmware.

As shown, computer system 400 includes a bus 430, a processor 405, communication port 410, a main memory 415, a removable storage media 440, a read only memory 420 and a mass storage 425. A person skilled in the art will appreciate that computer system 400 may include more than one processor and communication ports.

Examples of processor 405 include, but are not limited to, an Intel® Itanium® or Itanium 2 processor(s), or AMD® Opteron® or Athlon MP® processor(s), Motorola® lines of processors, FortiSOC™ system on a chip processors or other future processors. Processor 405 may include various modules associated with embodiments of the present invention.

Communication port 410 can be any of an RS-232 port for use with a modem based dialup connection, a 10/100 Ethernet port, a Gigabit or 10 Gigabit port using copper or fiber, a serial port, a parallel port, or other existing or future ports. Communication port 410 may be chosen depending on a network, such a Local Area Network (LAN), Wide Area Network (WAN), or any network to which computer system 400 connects.

Memory 415 can be Random Access Memory (RAM), or any other dynamic storage device commonly known in the art. Read only memory 420 can be any static storage device(s) such as, but not limited to, a Programmable Read Only Memory (PROM) chips for storing static information such as start-up or BIOS instructions for processor 405.

Mass storage 425 may be any current or future mass storage solution, which can be used to store information and/or instructions. Exemplary mass storage solutions include, but are not limited to, Parallel Advanced Technology Attachment (PATA) or Serial Advanced Technology Attachment (SATA) hard disk drives or solid-state drives (internal or external, e.g., having Universal Serial Bus (USB) and/or Firewire interfaces), such as those available from Seagate (e.g., the Seagate Barracuda 7200 family) or Hitachi (e.g., the Hitachi Deskstar 7K1000), one or more optical discs, Redundant Array of Independent Disks (RAID) storage, such as an array of disks (e.g., SATA arrays), available from various vendors including Dot Hill Systems Corp., LaCie, Nexsan Technologies, Inc. and Enhance Technology, Inc.

Bus 430 communicatively couples processor(s) 405 with the other memory, storage and communication blocks. Bus 430 can be, such as a Peripheral Component Interconnect (PCI)/PCI Extended (PCI-X) bus, Small Computer System Interface (SCSI), USB or the like, for connecting expansion cards, drives and other subsystems as well as other buses, such a front side bus (FSB), which connects processor 405 to system memory.

Optionally, operator and administrative interfaces, such as a display, keyboard, and a cursor control device, may also be coupled to bus 430 to support direct operator interaction with computer system 400. Other operator and administrative interfaces can be provided through network connections connected through communication port 410.

Removable storage media 440 can be any kind of external hard-drives, floppy drives, IOMEGA® Zip Drives, Compact Disc-Read Only Memory (CD-ROM), Compact Disc-Re-Writable (CD-RW), Digital Video Disk-Read Only Memory (DVD-ROM).

Components described above are meant only to exemplify various possibilities. In no way should the aforementioned exemplary computer system limit the scope of the present disclosure.

While embodiments of the invention have been illustrated and described, it will be clear that the invention is not limited to these embodiments only. Numerous modifications, changes, variations, substitutions, and equivalents will be apparent to those skilled in the art, without departing from the spirit and scope of the invention, as described in the claims.

What is claimed is:

1. A method comprising:
   maintaining, by a network security device, a network traffic log, wherein the network traffic log includes a plurality of entries each including features associated with one of a plurality of network activities observed within a private network, wherein the network activities include a plurality of interactions, including requests and responses relating to web resources, between hosts associated with the private network and external servers hosting the web resources, wherein the features include, for each of the network activities: (i) a hash of a received file or a hash of a requested Uniform Resource Identifier (URI); (ii) one or more of a source Internet Protocol (IP) address and a destination IP address and (iii) information regarding a user within the private network associated with the network activity;
   responsive to an event, retrospectively scanning, by the network security device, a subset of the plurality of entries of the network traffic log in an attempt to identify a threat that was missed by a previous real-time signature-based scan or a previous real-time reputation-based scan of the observed network activities, wherein the subset of the plurality of entries includes only those entries of the plurality of entries corresponding to those of the network activities observed within a particular timeframe; and
   when the threat is identified as a result of said retrospectively scanning, then performing, by the network security device, one or more of a remedial action and a preventive action with respect to the threat.

2. The method of claim 1, wherein the event comprises receipt by the network security device of updated signature database information for use by the network security device in connection with performing signature-based scanning.

3. The method of claim 2, wherein said retrospectively scanning comprises applying the updated signature database information to the network traffic log by performing the signature-based scanning based on one or more of the features.

4. The method of claim 1, wherein the event comprises receipt by the network security device of updated reputation database information for use by the network security device in connection with performing reputation-based scanning.

5. The method of claim 4, wherein said retrospectively scanning comprises applying the updated reputation database information to the network traffic log by performing the reputation-based scanning based on one or more of the features.

6. The method of claim 1, wherein the event comprises a predetermined or configurable scheduled timer event.

7. The method of claim 1, wherein the network traffic log resides within the private network.

8. The method of claim 1, wherein the network traffic log includes information collected by a plurality of other network security devices.

9. The method of claim 1, said retrospectively scanning is further limited to scanning only those of the plurality of entries within the network traffic log that were flagged by the previous real-time signature-based scan or the previous real-time reputation-based scan as being a potential security threat.

10. The method of claim 1, wherein the preventive action comprises an action seeking to prevent potential damage resulting from the threat or seeking to defend against the threat.

11. The method of claim 10, wherein the preventative action includes one or more of
    increasing security scrutiny for a source associated with the threat;
    decreasing a security reputation score of the source;
    blocking the source; and
    blocking of other potential threats that share significant features with the threat.

12. The method of claim 1, wherein the remedial action comprises one or more of:
    notifying a user mapped to the threat;
    notifying an administrator of the network security device;
    increasing security scrutiny for a destination associated with the threat;
    decreasing a security reputation score of the destination; and
    blocking the destination.

13. The method of claim 2, wherein the particular timeframe has a starting point defined by a first time at which the threat was first detected by a network security community and an ending point defined by a second time at which a signature was created for detecting the threat.

14. A non-transitory computer-readable storage medium embodying a set of instructions, which when executed by one or more processors of a network security device, causes the one or more processors to perform a method comprising:
    maintaining a network traffic log, wherein the network traffic log includes a plurality of entries each including features associated with one of a plurality of network activities observed within a private network, wherein the network activities include a plurality of interactions, including requests and responses relating to web resources, between hosts associated with the private network and external servers hosting the web resources, wherein the features include, for each of the network activities: (i) a hash of a received file or a hash of a requested Uniform Resource Identifier (URI); (ii) one or more of a source Internet Protocol (IP) address and a destination IP address and (iii) information regarding a user within the private network associated with the network activity;

responsive to an event, retrospectively scanning a subset of the plurality of entries of the network traffic log in an attempt to identify a threat that was missed by a previous real-time signature-based scan or a previous real-time reputation-based scan of the observed network activities, wherein the subset of the plurality of entries includes only those entries of the plurality of entries corresponding to those of the network activities observed within a particular timeframe; and when the threat is identified as a result of said retrospectively scanning, then performing, by the network security device, one or more of a remedial action and a preventive action with respect to the threat.

15. The non-transitory computer-readable storage medium of claim 14, wherein the event comprises receipt by the network security device of updated signature database information for use by the network security device in connection with performing signature-based scanning.

16. The non-transitory computer-readable storage medium of claim 15, wherein said retrospectively scanning comprises applying the updated signature database information to the network traffic log by performing the signature-based scanning based on one or more of the features.

17. The non-transitory computer-readable storage medium of claim 14, wherein the event comprises receipt by the network security device of updated reputation database information for use by the network security device in connection with performing reputation-based scanning.

18. The non-transitory computer-readable storage medium of claim 17, wherein said retrospectively scanning comprises applying the updated reputation database information to the network traffic log by performing the reputation-based scanning based on one or more of the features.

19. The non-transitory computer-readable storage medium of claim 14, wherein the remedial action comprises one or more of:

notifying a user mapped to the threat;
notifying an administrator of the network security device;
increasing security scrutiny for a destination associated with the threat;
decreasing a security reputation score of the destination; and
blocking the destination.

20. The non-transitory computer-readable storage medium of claim 15, wherein the particular timeframe has a starting point defined by a first time at which the threat was first detected by a network security community and an ending point defined by a second time at which a signature was created for detecting the threat.

* * * * *